United States Patent Office 3,071,442
Patented Jan. 1, 1963

3,071,442
PREPARATION OF STABILIZED SULFUR
DICHLORIDE
John H. Schmadebeck, Lewiston, N.Y., assignor to
Hooker Chemical Corporation, Niagara Falls, N. Y., a
corporation of New York
No Drawing. Filed Nov. 12, 1959, Ser. No. 852,227
20 Claims. (Cl. 23—205)

This invention relates to a method of preparing sulfur dichloride. More particularly this invention also relates to a sulfur dichloride composition stabilized against decomposition.

Sulfur dichloride is used extensively as a chemical intermediate or a reagent in the preparation of organic acid anhydrides, insecticides, rubber cements, rubber substitutes, and lubricant additives.

Sulfur dichloride may be prepared by the chlorination of sulfur, sulfur monochloride, or mixtures thereof. Typical methods are disclosed in United States Patent No. 875,231, issued December 31, 1907, No. 961,550, issued June 14, 1910, and No. 1,341,423, issued May 20, 1920. Sulfur dichloride produced by conventional procedures is generally an equilibrium mixture of sulfur dichloride and sulfur monochloride containing between about sixty-five and about eightly percent by weight of the dichloride.

At atmospheric pressure, the boiling point of sulfur dichloride is about fifty-nine degrees centigrade and the boiling point of sulfur monochloride is about one hundred and thirty-eight degrees centigrade. Thus, factional distillation can be employed to separate sulfur dichloride from sulfur monochloride. However, sulfur dichloride tends to decompose into sulfur monochloride and chlorine at temperatures above about fifty-nine degrees centigrade, and the recovery of pure sulfur dichloride by such a technique is relatively low. In addition, the pure product decomposes upon standing at room temperature in accordance with the equation:

(1) 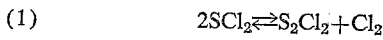
$$2SCl_2 \rightleftharpoons S_2Cl_2 + Cl_2$$

and eventually forms the aforesaid equilibrium mixture.

Chlorine can be dissolved in the equilibrium mixture of sulfur dichloride and sulfur monochloride to produce substantially pure sulfur dichloride. However, this product is also unstable and decomposes upon standing to produce the aforesaid equilibrium mixture. Thus, it can be seen that unless the pure sulfur dichloride is used immediately after it is prepared, there is a significant degradation and the resultant equilibrium mixture may not give the desired reaction product when subsequently used as a reaction intermediate. It is a common practice in the industry today for one manufacturer to produce the sulfur dichloride and another manufacturer to purchase this reagent and employ it in the production of an intermediate or final product. Generally, a period of several weeks or months passes before the sulfur dichloride produced at one location is used as a reagent at another location. Appreciable deterioration of the sulfur dichloride occurs during this period.

Feher et al., in Zeit. anorg. allge. Chemie, vol 290 (1957), page 305, disclose a method of stabilizing sulfur dichloride with a small amount of phosphorus trichloride. In this method, sulfur monochloride is chlorinated in the presence of a small proportion of iron powder to produce a reaction product containing sulfur dichloride. After adding a small proportion of phosphorus trichloride, the reaction product is rectified and the sulfur dichloride product recovered. The sulfur dichloride thus obtained, after adding a small additional amount of phosphorus trichloride, is stored at a temperature of zero degrees centigrade to inhibit chlorine volatilization. Such a technique has some effect upon stabilizing sulfur dichloride, but is impractical from a commercial standpoint because of the expense involved in refrigerating the sulfur dichloride during transportation and storage.

It is an object of the present invention to provide highly concentrated sulfur dichloride stabilized against decomposition.

It is a further object of the invention to provide a method of preparing stabilized sulfur dichloride in highly concentrated form.

Another object of the present invention is to provide a novel stabilizer for sulfur dichloride.

Still another object of the invention is to substantially inhibit the evolution of chlorine from pure sulfur dichloride while stored for extended periods.

A further object of the invention is to improve the yield of sulfur dichloride when distilling sulfur dichloride from a mixture of sulfur dichloride and sulfur monochloride.

These and other objects of the invention will be apparent from the following detailed description of the invention.

It has now been discovered that when a mixture of sulfur dichloride and sulfur monochloride is distilled in the presence of a stabilizing proportion of an organic phosphorus compound to produce a highly concentrated sulfur dichloride product, and the resulting product is admixed with an additional stabilizing proportion of organic phosphorus compound, the sulfur dichloride product thus obtained is stabilized against chlorine evolution while stored for extended periods of time, for example, as long as about three months.

It has also been found that any sulfur dichloride containing a minor portion of sulfur monochloride may be treated in accordance with the process of this invention. It is preferred to employ a mixture of sulfur dichloride and sulfur monochloride prepared by the chlorination of sulfur monochloride in the presence of a catalyst, such as ferric chloride, carbon, and the like. Such a mixture generally contains at least about sixty-five percent sulfur dichloride and less than about thirty-five percent sulfur monochloride by weight. However, mixtures prepared by any suitable technique may be employed. Trace amounts of ferric chloride, carbon and other sulfur chlorides may be present in the mixture. If desired, substantially pure sulfur dichloride may also be stabilized by the technique of the instant invention.

The term "organic phosphorus compound," as used throughout the description and claims, is intended to include phosphites selected from the group consisting of dialkyl hydrogen phosphites, dialkyl chlorophosphites, trialkyl phosphites, and mixtures thereof.

Typical examples of suitable dialkyl hydrogen phosphites are diethyl hydrogen phosphite, dimethyl hydrogen phosphite, diisopropyl hydrogen phosphite, di-n-butyl hydrogen phosphite, di-n-propyl hydrogen phosphite, di-2-ethylhexyl hydrogen phosphite, dicyclohexyl hydrogen phosphite, bis-2-chloroethyl hydrogen phosphite, bis-2-chloropropyl hydrogen phosphite, di-n-octyl hydrogen phosphite, di-octadecyl hydrogen phosphite, ethyl n-butyl hydrogen phosphite, methylhexyl hydrogen phosphite, ethylbenzyl hydrogen phosphite, diisobutyl hydrogen phosphite, dilauryl hydrogen phosphite, and the like.

In addition, secondary phosphites that are cyclic in nature can also be used. Typical examples are ethylene hydrogen phosphite, 1,3-propylene hydrogen phosphite, 2,3-butylene hydrogen phosphite, hexylene hydrogen phosphite and alloxymethylethylene hydrogen phosphite.

Dialkyl chloro phosphites are also effective and can be named as phosphorochloridities. Typical examples of phosphorochloridites that are suitable are diethyl phosphorochloridite, ethylbutyl phosphorochloridite, ethylene phosphorochloridite, 1,3-propylene phosphorochloridite, 2,3-butylene phosphorochloridite, dibutyl phosphorochloridite, didecyl phosphorochloridite, distearyl phosphorochloridite, dicyclohexyl phosphorochloridite, bis-2-chloroethyl phosphorochloridite, bis-2-chloropropyl phosphorochloridite, di-n-octyl phosphorochloridite, dioctadecyl phosphorochloridite, ethyl-n-butyl phosphorochloridite, methylhexyl phosphorochloridite, ethylbenzyl phosphorochloridite, diisobutyl phosphorochloridite, dilauryl phosphorochloridite, ethylene phosphorochloridite, 1,3-propylene phosphorochloridite, 2,3-butylene phosporochloridite, hexylene phosporochloridite, alloxymethylethylene phosphorochloridite, and the like.

Typical examples of suitable trialkyl phosphites include triethyl phosphite, trimethyl phosphite, tri-n-propyl phosphite, tributyl phosphite, trioctyl phosphite, tribenzyl phosphite, triisodecyl phosphite, tris(2,2,2-trifluoroethyl) phosphite, tris(2,2,3,3-tetrafluoropropyl) phosphite, tris(2-chloroethyl) phosphite, triisobutyl phosphite, isodecyl ethylene phosphite, butyl ethylene phosphite, ethyl hexylene phosphite, 2-chloroethylethylene phosphite, decyloctylene phosphite and the like.

As can be seen from the above mentioned exemplary compounds, the term "alkyl" is meant to include unsubstituted alkyls as well as halogen-substituted alkyls. The alkyl phosphorodichloridites are also effective as stabilizers.

Other organic compounds such as 2,4,5'-trichlorophenyl thiophosphate and boron trifluoride-dimethyl ether complex may also be employed as stabilizers.

The organic phosphorus compound is admixed with impure sulfur dichloride in a proportion between about 0.2 and about 1.0 percent, and preferably between about 0.3 and 0.6 percent by weight of the impure sulfur dichloride. If the proportion of the organic phosphorus compound is less than about 0.2 percent by weight, the stabilizing effect upon the final product is markedly reduced. A proportion of the organic phosphorus compound in excess of about 1.0 percent has a stabilizing effect, but may unnecessarily adulterate the final product.

Impure sulfur dichloride admixed with an organic phosphorus compound in the above described proportions is then fractionally distilled to produce a substantially pure, highly concentrated sulfur dichloride product. Distillation is effected in a conventional distillation apparatus comprised of a pot, column, condenser, reflux means, condensate receiver, and venting means. The column is provided with sufficient plates or packing, such as Berl saddles, to provide at least about two and one-half theoretical transfer units or plates.

In starting up the fractional distillation operation, the mixture of impure sulfur dichloride and organic phosphorus compound is charged into the distillation pot and heated to boiling. The boiling temperature of the pot liquor is initially about sixty degrees centigrade, but this temperature gradually increases as the distillation progresses. It is convenient to discontinue the distillation when the pot temperature rises above about one hundred and forty degrees centigrade, leaving a small portion of the sulfur dichloride in the pot residue for subsequent recovery.

The vapor or gas phase produced during the distillation step is divided into two fractions on the basis of temperature. The first fraction, or foreshot, is the vapor discharged from the top of the column at a vapor temperature of below about fifty degrees centigrade, and preferably below about fifty-five degrees centigrade. The foreshot is a mixture of sulfur dichloride and chlorine, and comprises generally less than about five percent by weight of the initial charging stock. The foreshot is collected and may be recycled for use in chlorinating sulfur and/or sulfur monochloride to prepare crude sulfur dichloride.

The second vapor fraction, or concentrate fraction, is the vapor leaving the top of the column at a vapor temperature of between about fifty and about seventy-five degrees centigrade, and preferably between about fifty-five and about sixty-five degrees centigrade. The purest product is generally obtained at a vapor temperature between about fifty-eight and about sixty degrees centigrade. This fraction is liquefied by cooling in the condenser to a temperature below the boiling point, and preferably to a temperature between about thirty and about fifty degrees centigrade. One portion of the resulting condensate is recycled to the top of the column for reflux, and the other portion which is sulfur dichloride in a highly concentrated form, is conveyed to the condensate receiver. A reflux ratio (recycle:product) of between about 1:2 and about 1:4 is preferably employed.

When the vapor temperature at the top of the column rises above about seventy-five degrees centigrade and preferably above about sixty-five degrees centigrade, the distillation is stopped. Although the distillation is controlled by the vapor temperature, it is desirable to stop the distillation when the pot residue reaches a temperature of about one hundred and forty degrees centigrade, and preferably about one hundred degrees centigrade. Pot temperatures above about one hundred and forty degrees centigrade should be avoided because of the relatively high proportion of sulfur monochloride vaporized at such temperatures. The pot residue, which is predominantly sulfur monochloride may be recycled to the chlorination step wherein sulfur monochloride is chlorinated to produce impure sulfur dichloride in accordance with the prior art technique.

The concentrated sulfur dichloride condensate collected in the condensate receiver is admixed with an organic phosphorus compound, the proportion of organic phosphorus compound being equivalent to between about 0.2 and about 1.0 percent, and preferably between about 0.3 and about 0.6 percent by weight of the sulfur dichloride condensate. The resulting mixture, which is highly concentrated sulfur dichloride containing less than about five percent sulfur monochloride, may be stored for almost three months without significant loss of chlorine or other decomposition.

It will be recognized by those skilled in the art, that the type of packing, the number of theoretical plates and the reflux ratio employed in the distillation step to give the optimum yield of sulfur dichloride may vary with the particular type of distillation apparatus employed. A further modification of the invention is that one type of stabilizer may be added prior to distillation, and a different type of stabilizer may be added to the sulfur dichloride concentrate after distillation.

It has been found that when impure sulfur dichloride is distilled in the absence of an organic phosphorus compound and then a small proportion of an organic phosphorus compound is admixed with the pure sulfur dichloride condensate, stabilization of the sulfur dichloride is not readily effected, and improved yields of sulfur dichloride in the distillation step are not attained. Thus, it is essential to the instant invention to carry out the distillation of sulfur dichloride in the presence of the organic phosphorus compound. It is also desirable to add an additional proportion of organic phosphorus compound to the sulfur dichloride condensate product produced in the distillation step.

The following examples are presented to explain the invention more completely, without any intention of being limited thereby. All parts and percentages are by weight unless otherwise specified. A crude mixture of sulfur dichloride and sulfur monochloride containing about seventy-five percent sulfur dichloride, prepared by the chlorination of sulfur monochloride in the presence of a ferric chloride catalyst, was used in the following tests.

*Example 1*

Two thousand and fifty-eight grams of crude sulfur dichloride were admixed with ten grams of bis(2-chloroethyl) hydrogen phosphite and placed in the distillation pot of a distillation unit. Distillation of the resulting mixture was effected in a unit comprised of a distillation pot, a packed column, a condenser, a reflux means, a condensate receiver and venting means. The distillation pot had a volume of about two liters and was heated by means of a standard laboratory hemispherical electric heating mantle. A Pyrex glass column, three-quarters of an inch in diameter by fifteen inches in height, packed with one-quarter inch Berl saddles, was secured to the top of the distillation pot. Temperature measuring means were provided in the pot and in the vapor line at the top of the column.

The treated sulfur dichloride was distilled by heating from ambient temperature to a final pot temperature of about one hundred and thirty-eight degrees centigrade. Three vapor fractions were collected during the distillation step. The foreshot, i.e., vapor produced at a vapor temperature between forty-five and fifty-five degrees centigrade, was condensed, collected, and weighed. This fraction comprised about 0.6 percent of the charging stock. The vapor having a temperature between fifty-five and sixty degrees centigrade was condensed and collected in the condensate receiver, while maintaining a reflux ratio of about 1:3. This fraction, which was concentrated sulfur dichloride, comprised 70.8 percent of the charging stock, indicating a recovery equivalent to about ninety-four percent of the sulfur dichloride originally present in the feed. Vapors given off at a temperature above sixty degrees centigrade were condensed and combined with the pot residue. The combined residue, which was predominantly sulfur monochloride, comprised 21.1 percent of the charging stock. A loss of 7.5 percent of the charging stock during the distillation step was indicated by difference.

The concentrated sulfur dichloride fraction, which weighed one thousand, four hundred and fifty-eight grams, was admixed with seven grams of bis(2-chloroethyl) hydrogen phosphite, and stored at room temperature in a closed container. A periodic analysis of the stored material showed 1.3 percent sulfur monochloride present after twenty-seven days of storage. After seventy days of storage, there was 3.3 percent of sulfur monochloride present, and after ninety-seven days' storage, only 5.2 percent of the material was sulfur monochloride.

*Example 2*

The procedure of Example 1 was repeated, employing bis (2-chloroethyl)phosphorochloridite as the stabilizer. In this example, the foreshot was collected at a temperature between forty-six and fifty-five degrees centigrade, and comprised 5.0 percent of the charging stock. The concentrate fraction, i.e., vapors formed at a temperature between fifty-five and sixty-one degrees centigrade, was condensed and collected. This fraction comprised 53.1 percent of the charging stock, indicating a recovery of about seventy percent of the sulfur dichloride originally present in the feed. Vapors given off at a temperature above sixty-one degrees centigrade were condensed and combined with the pot residue. This fraction comprised thirty-six percent of the charging stock. A loss of 5.9 percent during the distillation was indicated by difference.

The product fraction, which weighed one thousand and sixty-five grams, was admixed with seven grams of bis(2-chloroethyl) phosphorochloridite and stored as in Example 1. After twenty-six days' storage, the sulfur dichloride contained only 2.5 percent sulfur monochloride, and after ninety-six days of storage, it contained only 8.6 percent sulfur monochloride.

*Example 3*

The procedure of Example 1 was repeated employing diethyl hydrogen phosphite as the stabilizer. The foreshot was collected at a vapor temperature between fifty-two and fifty-five degrees centigrade, and comprised 0.5 percent of the charging stock. Vapors produced at a temperature between fifty-five and fifty-nine degrees centigrade were collected as the concentrate fraction and condensed. This fraction comprised 69.8 percent of the charging stock, indicating a recovery of about ninety-three percent of the sulfur dichloride originally present in the feed. The combined pot residue and the vapor produced at a temperature above fifty-nine degrees centigrade, after condensing, comprised 25.9 percent of the charging stock. A loss of 2.8 percent of the charging stock was indicated by difference.

The product fraction, which comprised concentrated sulfur dichloride, weighed one thousand, three hundred and ninety-eight grams. This fraction was admixed with seven grams of diethyl hydrogen phosphite, and stored as in Example 1. This material contained only 6.0 percent sulfur monochloride after twenty-four days' storage and only 7.8 percent of the impurity after fifty-four days' storage.

*Example 4*

The procedure of Example 1 was repeated employing triethyl phosphite as the stabilizer. The foreshot was collected at a vapor temperature between forty-four and fifty-five degrees centigrade, and comprised 0.5 percent of the charging stock. The concentrate fraction was comprised of vapor collected at a vapor temperature of fifty-five to seventy-two degrees centigrade. This fraction comprised seventy-two percent of the charging stock, indicating a recovery of about ninety-eight percent sulfur dichloride originally present in the feed. The combination of the pot residue and the condensed vapor produced at a temperature above seventy-two degrees centigrade comprised 24.7 percent of the charging stock. A loss of 2.5 percent of the charging stock was indicated by difference.

The product fraction, which weighed one thousand, four hundred and forty-seven grams, was admixed with seven grams of triethyl phosphite, and then placed in a closed container and stored as in Example 1. After twenty-one days' storage, the product contained 3.8 percent sulfur monochloride, and after sixty-one days' storage contained only 4.5 percent of this impurity.

*Example 5*

The procedure of Example 1 was repeated employing boron trifluoride-dimethyl ether complex as the stabilizer. The vapor produced at a vapor temperature between fifty-two and sixty degrees centigrade was condensed and collected as the concentrate fraction. This fraction comprised 40.8 percent of the charging stock indicating a recovery of fifty-five percent sulfur dichloride originally present in the feed. The foreshot was collected at vapor temperatures between forty-two and fifty-two degrees centigrade, and comprised 2.5 percent of the charging stock. The combination of the pot residue and condensed vapors produced at a vapor temperature above sixty degrees centigrade, comprised 40.5 percent of the charging stock. A loss of 16.2 percent of the charging stock was indicated by difference. The product fraction, which weighed eight hundred and twenty-three grams, was admixed with seven grams of boron trifluoridedimethyl ether complex, then placed in a closed container, and stored as in Example 1. After two days' storage, the sulfur dichloride contained only 2.8 percent sulfur monochloride, and after thrty-nine days of storage, it was found to contain 7.9 percent of the impurity.

A comparison of the result of this example with the results of Examples 1–4 indicates that boron trifluoride-dimethyl ether complex is not as effective as the other organic phosphorus compounds from the standpoint of increasing the recovery of sulfur dichloride in the distillation step, but it is effective for stabilizing the product for periods as long as one month. In certain instances, organic phosphorus compounds cannot be employed as stabilizers, because phosphorus cannot be tolerated as an impurity in subsequent processing steps. In such cases, if boron is not detrimental in subsequent processing steps, the boron trifluoride-dimethyl ether complex may be employed as an effective stabilizer for sulfur dichloride.

Example 6

For purposes of comparison, phosphorus trichloride was employed as a stabilizer as in the prior art. The procedure of Example 1 was repeated, collecting a concentrate fraction at a vapor temperature between fifty-five and sixty-one degrees centigrade. This fraction, which weighed five hundred and seventeen grams, and which contained ninety-one percent of the sulfur dichloride originally present in the feed, was admixed with three grams of phosphorus trichloride. This mixture was placed in a covered container and stored as in Example 1. After one day the product contained three percent sulfur monochloride, and after thirteen days it contained eight percent of this impurity.

A comparison of the results obtained in Example 6 with those obtained by employing the novel stabilizers of Examples 1–5, shows that phosphorus trichloride is markedly inferior from the standpoint of effective stabilizing time. Furthermore, the recovery of sulfur dichloride obtained in Examples 1, 3 and 4 is superior to the recovery obtained when phosphorus trichloride is employed as a stabilizer.

It will be noted that excellent results are obtained when the present invention is used in conjunction with the process disclosed and claimed in my copending patent application S.N. 852,171 filed of even date herewith. This application discloses that sulfur dichloride is stabilized with a stabilizing proportion of phosphorus pentachloride. In addition, the process of the present invention may be advantageously used in conjunction with the process disclosed and claimed in my copending application S.N. 852,228, filed of even date herewith. This application discloses that sulfur dichloride is stabilized with a stabilizing proportion of a sulfur-bearing compound.

It will be understood that various modifications within the invention are possible, some of which are referred to above. Therefore, I do not wish to be limited except as defined by the appended claims.

I claim:

1. The method of preparing stabilized sulfur dichloride which comprises admixing sulfur dichloride with a stabilizing proportion of a phosphite selected from the group consisting of dialkyl hydrogen phosphites, dialkyl chlorophosphites, trialkyl phosphites and mixtures thereof, distilling the resulting mixture, recovering concentrated sulfur dichloride from said distillation step, and admixing a stabilizing proportion of said phosphite with said concentrated sulfur dichloride, whereby the resulting product is stabilized against decomposition.

2. The method of preparing stabilized sulfur dichloride which comprises admixing sulfur dichloride with a stabilizing proportion of between about 0.2 and about 1.0 percent by weight of a phosphite selected from the group consisting of dialkyl hydrogen phosphites, dialkyl chlorophosphites, trialkyl phosphites and mixtures thereof, distilling the resulting mixture, recovering concentrated sulfur dichloride from said distillation step, and admixing a stabilizing proportion of between about 0.2 and about 1.0 percent by weight of said phosphite with said concentrated sulfur dichloride, whereby the resulting product is stabilized against decomposition.

3. The method of claim 1 wherein said sulfur dichloride, prior to distillation, contains at least about sixty-five percent by weight of sulfur dichloride and less than about thirty-five percent by weight of sulfur monochloride.

4. The method of claim 1 wherein said phosphite is bis(2-chloroethyl)hydrogen phosphite.

5. The method of claim 1 wherein said phosphite is bis(2-chloroethyl) phosphorochloridite.

6. The method of claim 1 wherein said phosphite is diethyl hydrogen phosphite.

7. The method of claim 1 wherein said phosphite is triethyl phosphite.

8. The method of preparing stabilized sulfur dichloride which comprises admixing a phosphite selected from the group consisting of dialkyl hydrogen phosphites, dialkyl chloro phosphites, trialkyl phosphites, and mixtures thereof, with impure sulfur dichloride containing at least about sixty-five percent by weight of sulfur dichloride and less than about thirty-five percent by weight of sulfur monochloride, the proportion of said phosphite being between about 0.2 and about 1.0 percent by weight of said impure sulfur dichloride, heating said mixture to the boiling point whereby a vapor is produced, recovering the vapor fraction having a vapor temperature in the range between about fifty and about seventy-five degrees centigrade, cooling said vapor fraction to a temperature sufficient to effect liquefication thereof, whereby concentrated sulfur dichloride is produced, and admixing an additional proportion of said phosphite with said concentrated sulfur dichloride, said additional proportion being equivalent to between about 0.2 and about 1.0 percent by weight of said concentrated sulfur dichloride, whereby the resulting product is stabilized against decomposition.

9. The method of claim 8 wherein said vapor fraction is recovered at a vapor temperature in the range between about fifty-five and about sixty-five degrees centigrade.

10. The method of claim 8 wherein said phosphite is bis (2-chloroethyl) hydrogen phosphite.

11. The method of claim 8 wherein said phosphite is bis (2-chloroethyl) phosphorochloridite.

12. The method of claim 8 wherein said phosphite is diethyl hydrogen phosphite.

13. The method of claim 8 wherein said phosphite is triethyl phosphite.

14. A novel sulfur dichloride composition stabilized against decomposition comprised of sulfur dichloride containing a stabilizing proportion of a phosphite selected from the group consisting of dialkyl hydrogen phosphites, dialkyl chloro phosphites, trialkyl phosphites and mixtures thereof.

15. A novel sulfur dichloride composition stabilized against decomposition comprised of sulfur dichloride containing between about 0.2 and about 1.0 percent by weight of a phosphite selected from the group consisting of dialkyl hydrogen phosphites, dialkyl chloro phosphites, trialkyl phosphites and mixtures thereof.

16. The novel composition of claim 14 wherein said phosphite is bis(2-chloroethyl) hydrogen phosphite.

17. The novel composition of claim 14 wherein said phosphite is bis(2-chloroethyl) phosphorochloridite.

18. The novel composition of claim 14 wherein said phosphite is diethyl hydrogen phosphite.

19. The novel composition of claim 14 wherein said phosphite is triethyl hydrogen phosphite.

20. In a method of preparing stabilized sulfur dichloride which comprises a chlorinating step in which a sulfur compound selected from the group consisting of sulfur, sulfur monochloride, and mixtures thereof is chlorinated, whereby an impure sulfur dichloride product containing sulfur monochloride is produced, said impure sulfur dichloride is distilled and a concentrated sulfur dichloride product, a residue predominating in sulfur monochloride, and a foreshot containing sulfur dichloride and chlorine are produced thereby, the improvement which comprises admixing a stabilizing proportion of a phosphite selected from the group consisting of dialkyl hydrogen phosphites, dialkyl chloro phosphites, trialkyl phosphites and mixtures thereof with said impure sulfur dichloride prior to distillation, recycling said foreshot and said residue to said chlorinating step, and admixing a stabilizing proportion of said phosphite with said concentrated sulfur dichloride, whereby the resulting product is stabilized against decomposition.

References Cited in the file of this patent

Lorenz et al., in "Chemical Abstracts," vol. 47, No. 7, April 10, 1953, col. 3332.